US008258085B2

(12) United States Patent  
Melbouci et al.

(10) Patent No.: US 8,258,085 B2
(45) Date of Patent: Sep. 4, 2012

(54) OIL-WELL CEMENT FLUID LOSS ADDITIVE COMPOSTION

(75) Inventors: Mohand Melbouci, Wilmington, DE (US); Teng-Shau Young, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 528 days.

(21) Appl. No.: 12/156,394

(22) Filed: May 30, 2008

(65) Prior Publication Data

US 2008/0300151 A1 Dec. 4, 2008

Related U.S. Application Data

(60) Provisional application No. 60/932,425, filed on May 31, 2007.

(51) Int. Cl.
*C09K 8/10* (2006.01)
(52) U.S. Cl. ........ 507/215; 507/211; 507/214; 507/216; 507/217; 507/274; 507/276
(58) Field of Classification Search .................... None
See application file for complete search history.

(56) References Cited

U.S. PATENT DOCUMENTS

| 4,079,025 | A | * | 3/1978 | Young et al. | 525/54.3 |
|---|---|---|---|---|---|
| 4,868,263 | A | * | 9/1989 | Chen et al. | 526/312 |
| 4,883,537 | A | | 11/1989 | Burdick | 106/194 |
| 4,913,880 | A | * | 4/1990 | Chen et al. | 422/15 |
| 5,228,908 | A | | 7/1993 | Burdick et al. | 106/194 |
| 5,256,302 | A | * | 10/1993 | Perez et al. | 210/699 |
| 6,103,671 | A | * | 8/2000 | Dobson et al. | 507/261 |
| 6,465,587 | B1 | | 10/2002 | Bair et al. | 526/240 |
| 6,590,050 | B1 | * | 7/2003 | Bair et al. | 526/240 |
| 6,939,402 | B2 | * | 9/2005 | Choi et al. | 106/724 |

FOREIGN PATENT DOCUMENTS

| EP | 0 368 563 B1 | 2/1994 |
|---|---|---|
| EP | 0 357 962 B1 | 10/1994 |
| EP | 0 430 644 B1 | 5/1995 |
| EP | 0 569 699 B1 | 9/1996 |
| EP | 0 814 232 B1 | 12/2003 |
| WO | 02/46253 A2 | 6/2002 |

* cited by examiner

*Primary Examiner* — John J Figueroa
(74) *Attorney, Agent, or Firm* — Robert O'Flynn O'Brien; Joanne Mary Fobare Rossi; Shaorong Chen

(57) ABSTRACT

The present invention relates to compositions and use of fluidized polymer suspensions containing allyloxy linkage and its functional derivatives, and water soluble polymers for use in oil field applications as fluid additives for drilling and cementing processes.

19 Claims, No Drawings

OIL-WELL CEMENT FLUID LOSS ADDITIVE COMPOSTION

RELATED APPLICATIONS

This application claims the benefit of U.S. Provisional Application Ser. No. 60/932,425, filed on May 31, 2007, which is incorporated herein by reference in its entirety.

FIELD OF THE INVENTION

The present invention relates to a composition and use application of water-soluble polymers and co-polymers for oil-well servicing fluids, such as cementing or drilling applications. Specifically, the present invention relates a mixture of a synthetic polymer containing allyloxy linkage and its functional derivatives and hydroxyethyl cellulose and for its use in oil field applications as a fluid loss additive for drilling fluids and cementing slurries. More specifically, a pumpable liquid product comprising a mixture of a synthetic polymer containing allyloxy linkage and its functional derivatives and hydroxyethyl cellulose.

BACKGROUND FOR THE INVENTION

Polymers are used extensively in oil field application as fluid additives for drilling, cementing, gas and oil well fracturing and enhanced-oil-recovery processes. Synthetic, organic, and inorganic polymers, as well as cellulose ethers and guar gum and guar derivatives, are widely used in oil field applications. These materials are also applied in a variety of formation-damage control applications and as dispersing agents.

In the initial drilling operation of an oil or gas well, a drilling fluid, commonly referred as "drilling mud," is pumped under pressure down to a string of drill pipes through the center of the drilling bit, back through the space or annulus between the outside of the drilling stem and the borehole wall, and finally back to the surface. After a well has been drilled and oil discovered, one or more subterranean, hydrocarbon-producing formations are most often encountered. The well is then completed to obtain the maximum hydrocarbon production from the subterranean producing formations.

Completion of a well refers to the operations performed during the period from drilling-in the pay zone until the time the well is put into production. These operations may include additional drilling-in, placement of downhole hardware, perforation, sand control operations, such as gravel packing, and cleaning out downhole debris. A completion fluid is often defined as a wellbore fluid used to facilitate such operations. The completion fluid's primary function is to control the pressure of the formation fluid by virtue of its specific gravity. The type of operation performed, the bottom hole conditions, and the nature of the formation will dictate other properties, such as viscosity. Use of completion fluids also clean out the drilled borehole. Oil well cement compositions are used in the completion operation to make a permanent, leak proof well for continuous use.

In cementing operations of gas or oil wells, hydraulic cement is normally mixed with sufficient water to form a pumpable slurry and the slurry is injected into a subterranean zone to be cemented. After placement in the zone, the cement slurry sets into a hard mass. In primary cementing, where cement slurry is placed in the annulus between a casing or liner and the adjacent earth formations, loss of fluid is a major concern. The formations can result in premature gelation of the cement slurry and bridging of the annulus before proper placement of the slurry. In remedial cementing operations, the control of fluid loss is necessary to achieve the more precise cement slurry placement associated with such operations.

Among all other slurry properties, fluid loss control is one of the critical concerns for cement slurry formulation, especially at high temperature, high pressure (squeeze cement) and salt environments. The main purpose of fluid loss additives is to prevent the dehydration of the cement slurry that can reduce its pumpability as well as affecting its other designed properties. Loss of a significant amount of water from the cement slurry can cause changes in several important job parameters, such as reduced pumping time and increased frictional pressure. Fluid loss additives are used to help prevent water loss from cement slurries to the rock formation as the slurry is pumped into the annulus between the casing and the well bore. This allows displacing the maximum amount of mud, compressive strength development, and bonding between the formation and the casing. In fact, under harsh conditions and due to permeable zones, the slurry can dehydrate quickly and become unpumpable, preventing the extension of slurry into voids and channels, particularly where the annular space between the liner and the open hole is too narrow. Any bridging problem due to high fluid loss would considerably disturb the cement job and affect the integrity of the cement column.

A large variety of synthetic polymeric fluid loss additives have been used in drilling fluid and oil-well cement slurries. These synthetic polymeric fluid loss additives are mainly used for high temperature operations. Among many other mechanisms of action, it is well known that the fluid loss control efficiency is greatly affected by the molecular weight of the polymeric additive. However, for cement slurries, high Mw polymers (>1,000,000 Daltons) exhibit an undesirable side effect related to a viscosity increase of the slurry. Low Mw versions (<1,000,000 Daltons) are useful to prevent the viscosity side effect, but the slurry stability could be affected by cement settling and free water due to lack of suspending capacity of those polymers. It has been found that by using a selected hydroxyethyl cellulose in combination with a low Mw synthetic polymer, a pumpable liquid product that is effective in fluid loss control without a free water problem can be obtained.

Previously, it was not possible to prepare a liquid mixture of these two polymers that has a viscosity low enough to be pumpable. In fact, hydroxyethyl cellulose has a tendency to dissolve in the mixture, resulting in a gel like solution.

U.S. Pat. No. 4,883,536 describes suspensions of hydroxyethylcellulose prepared in concentrated aqueous solutions of diammonium sulfate or diammonium phosphate, and that these suspensions in turn were useful for rheology modification of latex paint. U.S. Pat. No. 5,228,908 describes that concentrated aqueous sodium formate solution can be employed for preparation of fluid suspensions of the polymers such as hydroxyethylcellulose as well. In U.S. Pat. No. 5,578,168, the use of a number of salts, including sodium formate, were shown to be useful for preparing aqueous suspensions of poly(ethylene oxide). In U.S. Pat. Nos. 5,541,241 and 5,489,638, it was demonstrated that sodium formate and other salts were useful for preparing aqueous suspensions of polyvinyl alcohol.

BRIEF DESCRIPTION OF THE INVENTION

The present invention is directed to an aqueous fluidized polymer suspension for use in various oilfield applications, particularly in cementing and drilling applications containing an allyloxy based co-polymer, a water soluble polymer; a salt; and an amount of water. The water soluble polymers of use in the present invention may be selected from the group consisting of hydroxyethylcellulose (HEC), carboxymethylcellulose (CMC), guar, guar derivatives and xanthan.

The present invention also relates to an oil-well servicing fluid comprising the aqueous fluidized polymer suspension; and a particulate component such as cement, silica flour, fumed silica, pozzoline, sodium silicate, calcium carbonate, barite, hematite and clay. The oil-well servicing fluid in certain embodiments may function as a cement slurry or in other embodiments may find utility as a drilling fluid.

DETAILED DESCRIPTION OF THE INVENTION

The present invention relates to a pumpable and stable mixture composition of a water soluble polymer with allyloxy based co-polymers, more fully described in U.S. Pat. No. 6,465,587 incorporated herein by reference in its entirety. The water soluble polymer is selected from the group consisting of hydroxyethylcellulose (HEC), carboxymethylcellulose (CMC), guar, guar derivatives and xanthan. A preferred water soluble polymer is HEC. The guar derivatives of use in the present invention include hydroxypropyl guar, carboxymethyl guar, and carboxymethyl hydroxypropyl guar.

These allyloxy based co-polymers contain allyloxy linkage and its functional derivatives as oil field fluid loss additives in drilling operations. Specifically, co-polymers containing acrylamide, and 3-allyloxypropanesulfonate ("AHPS") and other monomers are synthesized. The AHPS component of the co-polymers is thermally and hydrolytically stable at high pH, saturated salt and elevated temperature conditions.

One component of the copolymer of use in the present invention comprises monomeric repeat unit(s) of alpha, beta ethylenically unsaturated compound of Formula (I), $$-(E)-$$  Formula (I)

wherein "E" is the repeat unit obtained after polymerization of an alpha, beta ethylenically unsaturated compound, preferably a carboxylic acid, an amide form of the carboxylic acid, and a lower alkyl(C1-C6) ester or hydroxylated lower alkyl(C1-C6) ester of such carboxylic acid. Compounds from which "E" may be derived include the acrylic acid, methacrylic acid, acrylamide, maleic acid or anhydride, itaconic acid, crotonic acid, fumaric acid, styrene, styrene sulfonate, vinyl pyrrolidone, N-methylacrylamide, N-isopropylacrylamide, N-butylacrylamide, N,N-dimethylacrylamide, N-hydroxymethylacrylamide, N-hydroxymethylacrylamide and other N-alkylacrylamides. Water-soluble salt forms of the carboxylic acids are also of use in the copolymer of use in the present invention.

Another component of the copolymers is the repeat unit formed by the polymerization of a monomer containing sulfonate functionality as shown in Formula (II),

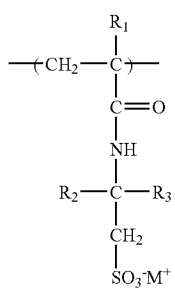

Formula (II)

wherein R.sub.1 is hydrogen or a lower alkyl(C1 to C5), $R_2$ and $R_3$ are identical or different and denote hydrogen, or $C_1$ to $C_5$ alkyl groups; and, M is hydrogen or a water-soluble cation (e.g., $NH_4^+$, alkali metal). 2-Acrylamido-2-methylpropanesulfonic acid ($AMPS^R$) is a typical example of a Formula (II) monomer. However, compounds such as styrene sulfonate, vinyl sulfonate and allyl sulfonate also fall in the category.

A third component of the copolymer is the repeat unit formed by the polymerization of a substituted allyl alkylene ether compound as shown in Formula (III),

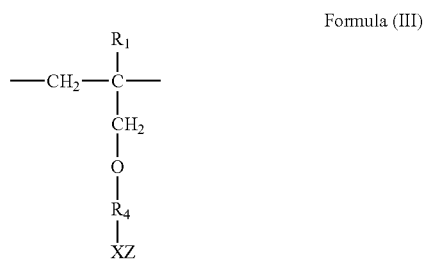

Formula (III)

wherein $R_1$ is hydrogen or lower alkyl(C1-C5), $R_4$ is a hydroxyl substituted alkylene group having from 1 to about 6 carbon atoms or a non-substituted alkyl or alkylene group having from 1 to about 6 carbon atoms; X is an anionic radical (e.g., sulfonate, phosphate, phosphite or phosphonate); and, Z is one or more hydrogen or a water soluble cation or cations which together counterbalance the charge of X. Compounds encompassed by Formula (III) include the repeat unit obtained after polymerization of 3-allyloxyhydroxypropanesulfonate, 3-allyloxyhydroxypropanesphosphite, and 3-allyloxyhydroxypropanesphosphate.

It is noted that more than one monomer unit in Formula I, II and III mentioned above may be present in the copolymers of use in the present invention. Therefore, the polymer of use in the present invention is comprised of copolymer, terpolymer and tetrapolymer or more wherein two, three, four or more different monomeric repeat units selected from the repeat units described in Formulas I, II, and III are present in the polymer. There is no limit to the kind and mole percent of the monomers chosen so long as the total mole percent adds up to 100 mole % and the resulting copolymers are water soluble or water dispersible.

Branching or cross-linking agents such as methylenebis(meth)acrylamide, polyethyleneglycol di(meth)acrylate, hydroxyacrylamide, allyl glycidyl ether, glycidyl acrylate and the like may also be added for the copolymers.

A particular allyloxy based co-polymer used in the various examples of the present invention is available from Hercules Incorporated as XxtraDura™ FLA 3766 universal fluid loss additive for cementing. Amongst the objectives of the present invention is to combine a water soluble polymer which is functioning as a free water control agent, with a relatively low Mw synthetic co-polymer, such as an allyloxy based co-polymer to improve free water control properties and ultimately stability of oil-well servicing fluids in general and cement slurry compositions in particular.

By applying aqueous fluidized polymer suspensions (FPS) technology, as generally taught in U.S. Pat. Nos. 4,883,536 and 5,228,908 incorporated herein by reference in their entireties, to a mixture of water soluble polymer and allyloxy based co-polymer, it was found that low viscosity/pumpable aqueous mixtures of water soluble polymer and an allyloxy based co-polymer containing a small amount of selected salts could be prepared at polymer solids content over 15%.

The salts used in producing the FPS of use in the present invention are selected from the group consisting of di-potassium phosphate, diammonium phosphate, sodium thiosulfate, boric acid, sodium formate, potassium formate, magnesium sulfate, cesium formate, potassium carbonate, sodium carbonate, sodium bicarbonate, diammonium sulfate, potassium acetate, sodium acetate and cesium acetate.

The salts are used in the FPS of the present invention in concentrations is in a range of about 2 wt % to less than about 30 wt %, preferably in the range of about 5 wt % to 10 wt %, of the aqueous fluidized polymer suspension.

The use of the aqueous FPS technology results in a stable, pourable fluid suspension containing high concentrations of water-soluble polymers.

"Suspension", "dispersion", "solution" and other terms are often confused. Thus, it should be understood that herein "suspension" and "dispersion" are used interchangeably to mean a system in which solid particles (water-soluble polymer) are dispersed in a liquid (water). It should also be understood that "solution" means a homogenous mixture of a solvent (e.g., water) with a solute (e.g., dissolved salt, dissolved water-soluble polymer, etc.).

The aqueous fluidized polymer suspension of the present invention is useful in producing various oil-well servicing fluids. The oil-well servicing fluids comprise the aqueous fluidized polymer suspension as well as a particulate component useful as cements, drilling fluids, etc. The particulate component may be any of the numerous particulate materials used in oil-well servicing fluids and selected from the group consisting of cement, silica flour, fumed silica, pozzoline, sodium silicate, calcium carbonate, barite, hematite and clay. A preferred particulate component is cement.

The invention will now be further described with reference to a number of specific examples which are to be regarded solely as illustrative, and not as restricting the scope of the invention.

EXAMPLES

Examples 1-12

Aqueous Fluidized Polymer Suspensions

Examples 1-12 are examples of various aqueous fluidized polymer suspensions are set forth in the following tables. All amounts are by weight, unless otherwise indicated.

The viscosity of the aqueous fluidized polymer suspensions of the present invention were determined using a Brookfield viscometer with a number 3 spindle and at 30 revolutions per minute. The viscosities are listed in centipoise cPs.

The aqueous fluidized polymer suspensions were made according to the teachings set forth in U.S. Pat. Nos. 4,883,536 and 5,228,908 where the salt is first added to the water and dissolved to produce an aqueous solution. Subsequently, the allyloxy based co-polymer and the water soluble polymer used in the suspension are added to the aqueous solution and mixed to produce the aqueous fluidized polymer suspensions of the present invention.

EXAMPLE 1

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 500 | 1420 | 6.51 | 41.2 | 1.25 |
| Tap Water | 50 | | | | |
| sodium thiosulfate, anhydrous | 100 | | | | |
| HEC (Natrosol ® 210HHX HEC, available from Hercules Incorporated) | 25 | | | | |
| Total | 675 | | | | |

EXAMPLE 2

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 500 | 1040 | 6.58 | 41.2 | 1.23 |
| Tap Water | 50 | | | | |
| sodium thiosulfate, anhydrous | 100 | | | | |
| HEC (Natrosol ® 210HHX HEC, available from Hercules Incorporated) | 25 | | | | |
| Total | 675 | | | | |

EXAMPLE 3

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 500 | 645 | 6.43 | 34.3 | 1.2 |
| Tap Water | 200 | | | | |
| sodium thiosulfate, anhydrous | 100 | | | | |
| HEC (Natrosol ® 210HHX HEC, available from Hercules Incorporated) | 40 | | | | |
| Total | 840 | | | | |

EXAMPLE 4

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 500 | 357 | 6.41 | 34 | 1.17 |
| Tap Water | 200 | | | | |
| sodium thiosulfate, anhydrous | 100 | | | | |

EXAMPLE 4-continued

|  | grams | Viscosity cPs | pH | Total Solids, % | Specific Gravity (g/cc). |
|---|---|---|---|---|---|
| HEC (Natrosol ® 250 HHBR HEC, available from Hercules Incorporated) | 40 | | | | |
| Total | 840 | | | | |

EXAMPLE 5

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 250 | 1250 | 6.28 | 34.8 | 1.15 |
| Tap Water | 55 | | | | |
| sodium thiosulfate, anhydrous | 25 | | | | |
| HEC (Natrosol ® 250H4BXR HEC, available from Hercules Incorporated) | 25 | | | | |
| Total | 355 | | | | |

EXAMPLE 6

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 250 | 842 | 6.51 | 28.7 | 1.22 |
| Tap Water | 10 | | | | |
| Boric Acid | 0.25 | | | | |
| Depolymerized guar | 0.5 | | | | |
| Total | 260.75 | | | | |

EXAMPLE 7

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 250 | 1690 | 6.79 | 28.6 | 1.11 |
| Tap Water | 36 | | | | |
| Boric Acid | 5 | | | | |
| Depolymerized guar | 9 | | | | |
| Total | 300 | | | | |

EXAMPLE 8

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 250 | 1720 | 6.37 | 35.2 | 1.17 |
| Tap Water | 65 | | | | |
| sodium thiosulfate, anhydrous | 25 | | | | |
| HEC (Natrosol ® 250H4BXR HEC, available from Hercules Incorporated) | 33 | | | | |
| Total | 373 | | | | |

EXAMPLE 9

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated | 250 | 2520 | 6.4 | 32.9 | 1.13 |
| Tap Water | 80 | | | | |
| sodium formate | 25 | | | | |
| HEC (Natrosol ® 210HHX HEC, available from Hercules Incorporated) | 25 | | | | |
| Total | 380 | | | | |

EXAMPLE 10

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 250 | 3190 | 8.16 | 33.8 | 1.15 |
| Tap Water | 50 | | | | |
| di-potassium phosphate, anhydrous | 20 | | | | |
| HEC (Natrosol ® 210HHX HEC, available from Hercules Incorporated) | 20 | | | | |
| Total | 340 | | | | |

EXAMPLE 11

|  | grams | Viscosity cPs | pH | Total Solids, % | Specific Gravity (g/cc). |
|---|---|---|---|---|---|
| allyloxy based co-polymer (XxtraDura ™ FLA 3766 additive, | 250 | 2040 | 8.04 | 30.6 | 1.13 |

EXAMPLE 11-continued

|  | grams | Viscosity cPs | pH | Total Solids, % | Specific Gravity (g/cc). |
|---|---|---|---|---|---|
| available from Hercules Incorporated) |  |  |  |  |  |
| Tap Water | 80 |  |  |  |  |
| di-potassium phosphate, anhydrous | 20 |  |  |  |  |
| HEC (Natrosol ® 210HHX HEC, available from Hercules Incorporated) | 18 |  |  |  |  |
| Total | 368 |  |  |  |  |

EXAMPLE 12

|  | grams | Viscosity cPs | pH | Total Solids, % | Specific Gravity (g/cc). |
|---|---|---|---|---|---|
| allyloxy based co-polymer (XxtraDura ™ FLA 3766 additive, available from Hercules Incorporated) | 125 | — | — | — | — |
| Tap Water | 45 |  |  |  |  |
| Sodium formate | 15 |  |  |  |  |
| HEC (Natrosol ® 210HHX HEC, available from Hercules Incorporated) | 8.5 |  |  |  |  |
| Total | 193.5 |  |  |  |  |

The above described aqueous fluidized polymer suspensions all appeared generally to be of utility in subsequent use in cement formulations.

Examples 13-21

Cement Formulations

Examples 13-21 are examples of cement formulations produced using various aqueous fluidized polymer suspensions examples as described above in order to demonstrate the performance of the aqueous fluidized polymer suspensions of the present invention in cementing applications. These cement formulations were tested at various temperatures for Fann Rheology as well as the amount of filtrate collected.

The rheology of the slurry was then measured with a FANN 35 viscometer at room temperature.

The performance testing of the oil well cement formulations were conducted in terms of rheology and fluid loss properties at variable bottom hole cement temperatures ("BHCT"). Typically, the rheology was measured just after the slurry preparation at room temperature (about 26.7° C., 80° F.), to simulate the mixing and pumping at the surface, and after conditioning the slurry under BHCT (about 82.2° C., 180° F.) for 20 minutes as recommended by the American Petroleum Institute ("API"). The fluid loss properties were measured at BHCT temperature after the formulations conditioning.

To simulate downhole circulating conditions, the cement formulations was then left for conditioning at the test temperature (BHCT) for 20 minutes. In the mean time, a high pressure/high temperature ("HPHT") fluid loss cell was pre-heated at the required test temperature.

After conditioning the cement formulations, the rheology was measured again at the test temperature as above as well as the fluid loss properties. The fluid loss properties are expressed as API fluid loss when the volume collected corresponds to the filtrate collected after 30 minutes testing or as calculated fluid loss when the test blows out before the test reaches 30 minutes.

| | | Comparative Example 1 Allyloxy based co-polymer | |
|---|---|---|---|
| Ingredients | Grams | | Percent by weight of cement (bwoc) |
| Long Star Class "H" Cement | 600 | | — |
| Silica Flour | 210 | | 35.0% |
| Cement retarder (C-202 retarder available from Benchmark Performance Group, Inc.) | 6.0 | | 1.0% |
| Allyloxy based co-polymer (XxtraDura ™ FLA 3766 additive, available from Hercules Incorporated) | 20.0 | | 1.0% |
| Blend of Composition | — | | — |
| DI Water | 303.0 | | 50.5% |
| | Mixing Rheology | API Rheology (After Cond.) | |
| Conditioning Temperature | 26.7° C. (80° F.) | 82.2° C. (180° F.) | 82.2° C. (180° F.) |
| Test Temperature | 26.7° C. (80° F.) | 26.1° C. (80° F.) | 81.2° C. (178.2° F.) |
| Fann Rheology (Down readings) | | | |
| 300-rpm DR | 202 | 200 | 82 |
| 200-rpm DR | 138 | 137 | 50 |
| 100-rpm DR | 70 | 69 | 22 |
| 6-rpm DR | 5 | 4 | 2 |
| 3-rpm DR | 3 | 2 | 1 |
| 600-rpm DR | 376 | 372 | 178 |

|  |  |  |  |
|---|---|---|---|
| Plastic viscosity (cPs) | 198 | 196.5 | 90 |
| Yield value (lb/100 ft$^2$) | 4.0 | 3.5 | −8.0 |
| Filtrate collected, cc |  |  |  |
| Test Temperature | 26.7° C. (80° F.) | 82.2° C. (180° F.) | 176.7° C. (350° F.) |
| FL @ 30 min. | 9.4 | 14 | 25.2 |
| 30 minute API Fluid Loss | 18.8 | 28 | 50.4 |
| Observations |  | Free water issue |  |

|  | Example 13 Containing aqueous fluidized polymer suspension of Example 3 | | Example 14 Containing aqueous fluidized polymer suspension of Example 3 | |
|---|---|---|---|---|
| Ingredients | Grams | Percent by weight of cement (bwoc) | Grams | Percent by weight of cement (bwoc) |
| Long Star Class "H" Cement | 600 | — | 600 | — |
| Silica Flour | 210 | 35.0% | 210 | 35.0% |
| Cement retarder (C-202 retarder available from Benchmark Performance Group, Inc.) | 6.00 | 1.0% | 6.00 | 1.0% |
| Allyloxy based co-polymer (XxtraDura ™ FLA 3766 additive, available from Hercules Incorporated) | — | — | — | — |
| Blend of Composition | 17.49 | 1.0% | 26.43 | 1.0% |
| DI Water | 303.0 | 50.5% | 303.0 | 50.5% |

|  | Mixing Rheology | API Rheology (After Cond.) | | Mixing Rheology | API Rheology (After Cond.) | |
|---|---|---|---|---|---|---|
| Conditioning Temperature | 26.7° C. (80° F.) | 82.2° C. (180° F.) | 82.2° C. (180° F.) | 26.7° C. (80° F.) | 82.2° C. (180° F.) | 82.2° C. (180° F.) |
| Test Temperature | 26.7° C. (80° F.) | 26.4° C. (79.6° F.) | 82° C. (179.6° F.) | 26.2° C. (79.2° F.) | 26.° C. (78.9° F.) | 81.7° C. (179.1° F.) |
| Fann Rheology (Down readings) |  |  |  |  |  |  |
| 300-rpm DR | 500 | 464 | 216 | >600 | >600 | 400 |
| 200-rpm DR | 378 | 340 | 148 | 582 | 538 | 288 |
| 100-rpm DR | 230 | 206 | 78 | 390 | 344 | 170 |
| 6-rpm DR | 24 | 19 | 5 | 65 | 45 | 14 |
| 3-rpm DR | 13 | 10 | 3 | 39 | 26 | 7 |
| 600-rpm DR | >600 | >600 | 414 | >600 | >600 | >600 |
| Plastic viscosity (cPs) | 405 | 387 | 207 | — | — | 345 |
| Yield value (lb/100 ft$^2$) | 95.0 | 77.0 | 9.0 | — | — | 55.0 |
| Filtrate collected, cc |  |  |  |  |  |  |
| Test Temperature | 26.7° C. (80° F.) | 82.2° C. (180° F.) | 176.7° C. (350° F.) | 26.7° C. (80° F.) | 82.2° C. (180° F.) | 176.7° C. (350° F.) |
| FL @ 30 min. | 13 | 19.4 | 33.6 | 11.8 | 15.6 | — |
| 30 minute API Fluid Loss | 26 | 38.8 | 67.2 | 23.6 | 31.2 | — |
| Observations |  | No free water issue |  |  | Best per settlement No free water issue |  |

|  | Example 15 Containing aqueous fluidized polymer suspension of Example 5 | | Example 16 Containing aqueous fluidized polymer suspension of Example 7 | |
|---|---|---|---|---|
| Ingredients | Grams | Percent by weight of cement (bwoc) | Grams | Percent by weight of cement (bwoc) |
| Long Star Class "H" Cement | 600 | — | 600 | — |
| Silica Flour | 0 | 35.0% | 0 | 35.0% |
| Cement retarder (C-202 retarder available from Benchmark Performance Group, Inc.) | 0.00 | 1.0% | 0.00 | 1.0% |
| Allyloxy based co-polymer (XxtraDura ™ FLA 3766 additive, available from Hercules Incorporated) | — | — | — | — |
| Blend of Composition | 0.00 | 1.0% | 0.00 | 1.0% |
| DI Water | 0.0 | 50.5% | 0.0 | 50.5% |

-continued

|  | Mixing Rheology | API Rheology (After Cond.) | | Mixing Rheology | API Rheology (After Cond.) | |
| --- | --- | --- | --- | --- | --- | --- |
| Conditioning Temperature | 26.7° C. (80° F.) | 82.2° C. (180° F.) | 82.2° C. (180° F.) | 26.7° C. (80° F.) | 82.2° C. (180° F.) | 82.2° C. (180° F.) |
| Test Temperature | 26.4° C. (79.5° F.) | 26.7° C. (80° F.) | 81.8° C. (179.2° F.) | 26.2° C. (79.2° F.) | 26.4° C. (79.6° F.) | 81.4° C. (178.5° F.) |
| Fann Rheology (Down readings) | | | | | | |
| 300-rpm DR | >600 | >600 | 344 | 172 | 164 | 80 |
| 200-rpm DR | >600 | 544 | 234 | 118 | 112 | 51 |
| 100-rpm DR | 420 | 342 | 128 | 61 | 57 | 24 |
| 6-rpm DR | 63 | 40 | 9 | 4 | 4 | 2 |
| 3-rpm DR | 37 | 22 | 5 | 2 | 2 | 1 |
| 600-rpm DR | >600 | >600 | >600 | 316 | 306 | 170 |
| Plastic viscosity (cPs) | — | — | 324 | 166.5 | 160.5 | 84 |
| Yield value (lb/100 ft$^2$) | — | — | 20.0 | 5.5 | 3.5 | −4.0 |
| Filtrate collected, cc | | | | | | |
| Test Temperature | 26.7° C. (80° F.) | 82.2° C. (180° F.) | 176.7° C. (350° F.) | 26.7° C. (80° F.) | 82.2° C. (180° F.) | 176.7° C. (350° F.) |
| FL @ 30 min. | 9.5 | 15.6 | — | 9.8 | — | — |
| 30 minute API Fluid Loss | 19 | 31.2 | — | 19.6 | — | — |
| Observations | Pretty good per settlement No free water | | | Free water issue | | |

|  | Example 17 Containing aqueous fluidized polymer suspension of Example 8 | | Example 18 Containing aqueous fluidized polymer suspension of Example 9 | |
| --- | --- | --- | --- | --- |
| Ingredients | Grams | Percent by weight of cement (bwoc) | Grams | Percent by weight of cement (bwoc) |
| Long Star Class "H" Cement | 600 | — | 600 | — |
| Silica Flour | 0 | 35.0% | 210 | 35.0% |
| Cement retarder (C-202 retarder available from Benchmark Performance Group, Inc.) | 0.00 | 1.0% | 6.00 | 1.0% |
| Allyloxy based co-polymer (XxtraDura ™ FLA 3766 additive, available from Hercules Incorporated) | — | — | — | — |
| Blend of Composition | 0.00 | 1.0% | 22.81 | 1.0% |
| DI Water | 0.0 | 50.5% | 303.0 | 50.5% |

|  | Mixing Rheology | API Rheology (After Cond.) | | Mixing Rheology | API Rheology (After Cond.) | |
| --- | --- | --- | --- | --- | --- | --- |
| Conditioning Temperature | 26.7° C. (80° F.) | 82.2° C. (180° F.) | 82.2° C. (180° F.) | 26.7° C. (80° F.) | 82.2° C. (180° F.) | 82.2° C. (180° F.) |
| Test Temperature | 25.9° C. (78.6° F.) | 26.2° C. (79.2° F.) | 81.6° C. (178.9° F.) | 26.1° C. (79° F.) | 26.2° C. (79.2° F.) | 81.4° C. (178.6° F.) |
| Fann Rheology (Down readings) | | | | | | |
| 300-rpm DR | >600 | >600 | 506 | >600 | >600 | 490 |
| 200-rpm DR | >600 | >600 | 364 | >600 | >600 | 358 |
| 100-rpm DR | 504 | 486 | 212 | 480 | 440 | 212 |
| 6-rpm DR | 86 | 70 | 17 | 92 | 70 | 20 |
| 3-rpm DR | 54 | 40 | 9 | 58 | 40 | 10 |
| 600-rpm DR | >600 | >600 | >600 | >600 | >600 | >600 |
| Plastic viscosity (cPs) | — | — | 441 | — | — | 417 |
| Yield value (lb/100 ft$^2$) | — | — | 65.0 | — | — | 73.0 |
| Filtrate collected, cc | | | | | | |
| Test Temperature | 26.7° C. (80° F.) | 82.2° C. (180° F.) | 176.7° C. (350° F.) | 26.7° C. (80° F.) | 82.2° C. (180° F.) | 176.7° C. (350° F.) |
| FL @ 30 min. | 12.6 | 15.6 | — | 9.8 | 14.6 | — |
| 30 minute API Fluid Loss | 25.2 | 31.2 | — | 19.6 | 29.2 | — |
| Observations | Pretty good per settlement No free water | | | No free water | | |

-continued

|  | Example 19<br>Containing aqueous fluidized polymer suspension of Example 10 | | Example 20<br>Containing aqueous fluidized polymer suspension of Example 11 | |
|---|---|---|---|---|
| Ingredients | Grams | Percent by weight of cement (bwoc) | Grams | Percent by weight of cement (bwoc) |
| Long Star Class "H" Cement | 600 | — | 600 | — |
| Silica Flour | 210 | 35.0% | 210 | 35.0% |
| Cement retarder (C-202 retarder available from Benchmark Performance Group, Inc.) | 6.00 | 1.0% | 6.00 | 1.0% |
| Allyloxy based co-polymer (XxtraDura ™ FLA 3766 additive, available from Hercules Incorporated) | — | — | — | — |
| Blend of Composition | 21.43 | 1.0% | 23.72 | 1.0% |
| DI Water | 303.0 | 50.5% | 303.0 | 50.5% |

|  | Mixing Rheology | API Rheology (After Cond.) | | Mixing Rheology | API Rheology (After Cond.) | |
|---|---|---|---|---|---|---|
| Conditioning Temperature | 26.7° C. (80° F.) | 26.7° C. (80° F.) | 82.2° C. (180° F.) | 26.7° C. (80° F.) | 26.7° C. (80° F.) | 82.2° C. (180° F.) |
| Test Temperature | 25.9° C. (78.7° F.) | 26.3° C. (79.4° F.) | 81.8° C. (179.3° F.) | 25.7° C. (78.2° F.) | 26.4° C. (79.6° F.) | 81.4° C. (178.6° F.) |
| Fann Rheology (Down readings) | | | | | | |
| 300-rpm DR | >600 | >600 | 442 | >600 | >600 | 384 |
| 200-rpm DR | >600 | >600 | 320 | >600 | 590 | 279 |
| 100-rpm DR | 506 | 430 | 187 | 446 | 380 | 160 |
| 6-rpm DR | 92 | 64 | 17 | 70 | 50 | 13 |
| 3-rpm DR | 60 | 38 | 9 | 41 | 28 | 6 |
| 600-rpm DR | >600 | >600 | >600 | >600 | >600 | >600 |
| Plastic viscosity (cPs) | — | — | 382.5 | — | — | 336 |
| Yield value (lb/100 ft$^2$) | — | — | 59.5 | — | — | 48.0 |
| Filtrate collected, cc | | | | | | |
| Test Temperature | 26.7° C. (80° F.) | 82.2° C. (180° F.) | 176.7° C. (350° F.) | 26.7° C. (80° F.) | 82.2° C. (180° F.) | 176.7° C. (350° F.) |
| FL @ 30 min. | 10.8 | 15.4 | — | 11.2 | 15.4 | — |
| 30 minute API Fluid Loss | 21.6 | 30.8 | — | 22.4 | 30.8 | — |
| Observations | | No free water | | | No free water | |

|  | Example 21<br>Containing aqueous fluidized polymer suspension of Example 12 | |
|---|---|---|
| Ingredients | Grams | Percent by weight of cement (bwoc) |
| Long Star Class "H" Cement | 600 | — |
| Silica Flour | 210 | 35.0% |
| Cement retarder (C-202 retarder available from Benchmark Performance Group, Inc.) | 6.00 | 1.0% |
| Allyloxy based co-polymer (XxtraDura ™ FLA 3766 additive, available from Hercules Incorporated) | — | — |
| Blend of Composition | 25.0 | 1% |
| DI Water | 303.0 | 50.5% |

|  | Mixing Rheology | API Rheology (After Cond.) | |
|---|---|---|---|
| Conditioning Temperature | 26.7° C. (80° F.) | 26.7° C. (80° F.) | 82.2° C. (180° F.) |
| Test Temperature | | | |
| Fann Rheology (Down readings) | | | |
| 300-rpm DR | >600 | >600 | 336 |
| 200-rpm DR | 5.4 | 484 | 240 |
| 100-rpm DR | 318 | 299 | 136 |
| 6-rpm DR | 40 | 34 | 10 |
| 3-rpm DR | 23 | 19 | 5 |
| 600-rpm DR | >600 | >600 | >600 |

| -continued | | | |
|---|---|---|---|
| Plastic viscosity (cPs) | — | — | 300 |
| Yield value (lb/100 ft²) | — | — | 36.0 |
| Filtrate collected, cc | | | |
| Test Temperature | 26.7° C. (80° F.) | 82.2° C. (180° F.) | 176.7° C. (350° F.) |
| FL @ 30 min. | 11 | 15.2 | 19 |
| 30 minute API Fluid Loss | 22 | 30.4 | 38 |
| Observations | | No free water | |

Experiments demonstrate that concentrations of salt in the range of about 5 wt % to 10 wt % are sufficient to prepare suspensions with water soluble polymer content in the range of about 1 wt % to 20 wt % of the aqueous fluidized polymer suspension. The resulting mixture viscosity was considered pumpable and was in the range of 280 cPs to 3200 cPs, depending upon the type and concentration of the water soluble polymer used as a free water agent (Natrosol®) 210 HHX hydroxyethylcellulose, Natrosol® 250H$_4$BXR hydroxyethylcellulose, and Natrosol® 250 HHBR hydroxyethylcellulose all available from Hercules Incorporated) as well as guar, including depolymerized guar. The mixtures were observed to be stable for over one (1) week.

Application data run with the HEC/allyloxy based co-polymer and depolymerized guar mixtures demonstrated a clear difference in term of rheology as compared to allyloxy based co-polymer used as a single component without sacrificing the fluid loss control properties. The rheology was much higher, and no free water was observed while the fluid loss remains in same order of magnitude.

The above application data indicates that easily pumpable and stable mixtures of water soluble polymers, such as hydroxyethylcellulose (HEC), carboxymethylcellulose (CMC), guar, guar derivatives and xanthan, and an allyloxy based co-polymer, were prepared using fluidized polymer suspension technology. The resulting mixtures would have utility in various oilfield applications, particularly in cementing and drilling applications.

While this invention has been described with respect to particular embodiments thereof, it is apparent that numerous other forms and modifications will be obvious from this disclosure to those skilled in the art. The appended claims and this invention generally should be construed to cover all such obvious forms and modifications which are within the true spirit and scope of the present invention.

We claim:

1. An aqueous fluidized polymer suspension for use in oilfield applications, comprising:
   an allyloxy based co-polymer;
   a water soluble polymer;
   a salt; and
   water;
   wherein the water soluble polymer is selected from the group consisting of hydroxyethylcellulose (HEC), carboxymethylcellulose (CMC), guar, guar derivatives and xanthan and wherein the allyloxy based co-polymer and the water soluble polymer are in dispersed in the water containing the salt.

2. The aqueous fluidized polymer suspension of claim 1, wherein the water soluble polymer comprises HEC.

3. The aqueous fluidized polymer suspension of claim 1, wherein the water soluble polymer comprises guar.

4. The aqueous fluidized polymer suspension of claim 1, wherein the salt is selected from the group consisting of di-potassium phosphate, diammonium phosphate, sodium thiosulfate, boric acid, sodium formate, potassium formate, magnesium sulfate, cesium formate, potassium carbonate, sodium carbonate, sodium bicarbonate, diammonium sulfate, potassium acetate, sodium acetate and cesium acetate.

5. The aqueous fluidized polymer suspension of claim 4, wherein salt is in a range of about 2 wt % to less than about 30 wt % of the aqueous fluidized polymer suspension.

6. The aqueous fluidized polymer suspension of claim 5, wherein salt is in the range of about 5 wt % to 10 wt % of the aqueous fluidized polymer suspension.

7. The aqueous fluidized polymer suspension of claim 1, wherein the water soluble polymer is in a range of about 1 wt % to 20 wt % of the aqueous fluidized polymer suspension.

8. The aqueous fluidized polymer suspension of claim 2, wherein the salt is selected from the group consisting of di-potassium phosphate, diammonium phosphate, sodium thiosulfate, boric acid, sodium formate, potassium formate, magnesium sulfate, cesium formate, potassium carbonate, sodium carbonate, sodium bicarbonate, diammonium sulfate, potassium acetate, sodium acetate and cesium acetate and wherein the salt is in a range of about 2 wt % to less than about 30 wt % of the aqueous fluidized polymer suspension.

9. The aqueous fluidized polymer suspension of claim 8, wherein the salt comprises sodium formate.

10. An oil-well servicing fluid comprising:
   a. an aqueous fluidized polymer suspension; and
   b. a particulate component
   wherein the aqueous fluidized polymer suspension further comprises an allyloxy based co-polymer, a salt, water, and a water soluble polymer selected from the group consisting of hydroxyethylcellulose (HEC), carboxymethylcellulose (CMC), guar, guar derivatives and xanthan.

11. The oil-well servicing fluid of claim 10 wherein the water soluble polymer comprises HEC.

12. The oil-well servicing fluid of claim 10, wherein the water soluble polymer comprises guar.

13. The oil-well servicing fluid of claim 10, wherein the salt is selected from the group consisting of di-potassium phosphate, diammonium phosphate, sodium thiosulfate, boric acid, sodium formate, potassium formate, magnesium sulfate, cesium formate, potassium carbonate, sodium carbonate, sodium bicarbonate, diammonium sulfate, potassium acetate, sodium acetate and cesium acetate.

14. The oil-well servicing fluid of claim 13, wherein the salt is in a range of about 1 wt % to less than about 30 wt % of the aqueous fluidized polymer suspension.

15. The oil-well servicing fluid of claim 14, wherein the salt is in the range of about 5 wt % to 10 wt % of the aqueous fluidized polymer suspension.

16. The oil-well servicing fluid of claim 10, wherein the water soluble polymer is in a range of about 1 wt % to 20 wt % of the aqueous fluidized polymer suspension.

17. The oil-well servicing fluid claim 10, wherein the particulate component is selected from the group consisting of cement, silica flour, fumed silica, pozzoline, sodium silicate, calcium carbonate, barite, hematite and clay.

18. The oil-well servicing fluid of claim 10, wherein the particulate component comprises cement.

19. The oil-well servicing fluid of claim 18, wherein the salt comprises sodium formate.

* * * * *